(12) United States Patent
Zhu et al.

(10) Patent No.: US 10,845,227 B2
(45) Date of Patent: Nov. 24, 2020

(54) CORIOLIS MASS FLOW MEASURING DEVICE AND/OR DENSITY MEASURING DEVICE

(71) Applicant: Endress + Hauser Flowtec AG, Reinach (CH)

(72) Inventors: Hao Zhu, Freising (DE); Alfred Rieder, Landshut (DE); Gerhard Eckert, Grenzach-Wyhlen (DE); Ennio Bitto, Aesch (CH)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 429 days.

(21) Appl. No.: 15/579,979

(22) PCT Filed: May 24, 2016

(86) PCT No.: PCT/EP2016/061643
§ 371 (c)(1),
(2) Date: Jul. 24, 2018

(87) PCT Pub. No.: WO2016/202537
PCT Pub. Date: Dec. 22, 2016

(65) Prior Publication Data
US 2019/0242738 A1   Aug. 8, 2019

(30) Foreign Application Priority Data
Jun. 18, 2015   (DE) .................. 10 2015 109 790

(51) Int. Cl.
*G01F 1/84* (2006.01)
*G01F 15/02* (2006.01)
*G01N 9/00* (2006.01)

(52) U.S. Cl.
CPC .......... *G01F 1/8477* (2013.01); *G01F 1/8409* (2013.01); *G01F 1/8413* (2013.01);
(Continued)

(58) Field of Classification Search
None
See application file for complete search history.

(56) References Cited

U.S. PATENT DOCUMENTS

| 5,301,557 A * | 4/1994 | Cage ............... G01F 1/8409 73/861.355 |
| 5,734,112 A | 3/1998 | Bose et al. |

(Continued)

FOREIGN PATENT DOCUMENTS

| CN | 1233322 A | 10/1999 |
| CN | 13 51707 A | 5/2002 |

(Continued)

OTHER PUBLICATIONS

Office Action dated Mar. 30, 2020 issued in corresponding Chinese application No. 201680034586.0.

(Continued)

*Primary Examiner* — Daniel S Larkin
(74) *Attorney, Agent, or Firm* — Bacon & Thomas, PLLC

(57) ABSTRACT

A Coriolis mass flow measuring device and/or density measuring device, comprising: at least two measuring tubes which extend mirror symmetrically to a first mirror plane; at least one exciter mechanism and at least one sensor arrangement for exciting and registering measuring tube oscillations; two terminally located collectors for joining the measuring tubes; a support body for connecting the collectors; and a number of plate-shaped couplers for pairwise connecting of the measuring tubes for forming an oscillator. The measuring tube centerlines of the measuring tubes have two oppositely bent sections and an intermediately lying straight section. The second bent section is arranged on the side of the straight section away from the second mirror plane. The projection of the measuring tube centerline between the intersection with the second mirror plane and the transition between the straight section and the second (Continued)

bent section onto the second mirror plane is not less than the separation between the second mirror plane and the measuring tube centerline at the transition between the straight section and the second bent section, wherein the first bent section has stiffening element, which annularly grip around the measuring tube.

19 Claims, 2 Drawing Sheets

(52) U.S. Cl.
CPC ............. *G01F 15/02* (2013.01); *G01N 9/002* (2013.01); *G01N 2009/006* (2013.01)

(56) References Cited

U.S. PATENT DOCUMENTS

| | | | | |
|---|---|---|---|---|
| 5,796,011 A * | 8/1998 | Keita | ................. | G01F 1/8409 |
| | | | | 73/861.357 |
| 2004/0040387 A1 * | 3/2004 | Nakao | ................. | G01F 1/8413 |
| | | | | 73/861.354 |
| 2005/0072238 A1 | 4/2005 | Wenger et al. | | |
| 2007/0074585 A1 * | 4/2007 | Bitto | ................. | G01F 1/8409 |
| | | | | 73/861.355 |
| 2011/0036179 A1 * | 2/2011 | Weinstein | ............. | G01F 1/8477 |
| | | | | 73/861.357 |
| 2012/0192658 A1 | 8/2012 | Hussain et al. | | |
| 2015/0082916 A1 | 3/2015 | Sukemura et al. | | |

FOREIGN PATENT DOCUMENTS

| | | |
|---|---|---|
| CN | 1556916 A | 12/2004 |
| CN | 102353411 A | 2/2012 |
| CN | 102735299 A | 10/2012 |
| CN | 10 3630178 A | 3/2014 |
| CN | 104246452 A | 12/2014 |
| DE | 10 2010 018 222 A1 | 10/2011 |
| DE | 10 2011 010 178 A1 | 8/2012 |
| DE | 10 2015 109 790 A1 | 12/2016 |
| EP | 1 296 119 A1 | 3/2003 |
| EP | 2381227 A1 | 10/2011 |
| EP | 2485020 A1 | 8/2012 |
| WO | 2012/136671 A1 | 10/2012 |

OTHER PUBLICATIONS

German Search Report, German PTO, Munich, dated Dec. 2, 2015.
International Search Report, EPO, The Netherlands, dated Oct. 31, 2016.
Chinese Office Action in corresponding Chinese Application No. 201680034586.0, dated May 21, 2019.

* cited by examiner

CORIOLIS MASS FLOW MEASURING DEVICE AND/OR DENSITY MEASURING DEVICE

TECHNICAL FIELD

The present invention relates to a Coriolis mass flow measuring device and/or density measuring device.

BACKGROUND DISCUSSION

A Coriolis mass flow measuring device and/or density measuring device of the field of the invention is disclosed, for example, in the European publication, EP 1 296 119 A1. It includes: at least two measuring tubes extending bent in the resting position, wherein the measuring tubes have measuring tube centerlines, which extend pairwise mirror symmetrically to a first mirror plane, which extends between the measuring tubes, wherein the measuring tube centerlines extend mirror symmetrically, in each case, to a second mirror plane, which extends perpendicularly to the first mirror plane; at least one exciter mechanism and at least one sensor arrangement; an inlet side collector and an outlet side collector, wherein the measuring tubes are connected with the collectors for flow from the inlet side collector into the measuring tubes and for flow from the measuring tubes into the outlet side collector; a support body, which connects the inlet side collector and the outlet side collector rigidly with one another; and on the inlet side and on the outlet side, in each case, two plate-shaped couplers, wherein the measuring tubes are connected pairwise with one another by means of the couplers, in order to form an oscillator, wherein the exciter mechanism is adapted to excite a bending oscillation, wanted mode between the two measuring tubes of the oscillator, and the sensor arrangement is adapted to register oscillations of the oscillator, wherein the measuring tube centerlines of the measuring tubes of at least one oscillator have between the second mirror plane and the collectors, in each case, a first bent section, a second bent section and a straight section, which is arranged between the bent sections and connects the two bent sections, wherein the first bent section and the second bent section are bent in opposite directions, wherein the second bent section is arranged, in each case, on the side of the straight section away from the second mirror plane, wherein the first bent section has between the second mirror plane and the straight section a stiffening element, which annularly grips around the measuring tube.

Coriolis mass flow measuring devices and/or density measuring devices are further described in Published International Application WO-A 01/33 174, WO-A 00/57 141, WO-A 98/07 009, U.S. Pat. No. 5,796,001, U.S. Pat. No. 4,781,069, European Patents, EP-A 1 001 254, and EP-A 553 939.

Bent measuring tubes are excited in the so-called wanted mode usually to bending oscillations. As a result of the bending oscillations, there are induced in the medium flowing through the measuring tubes Coriolis forces, which lead to oscillations in the Coriolis mode superimposed with equal frequency on the excited bending oscillations of the wanted mode. In the case of bent measuring tubes, thermally related expansions bring about practically no or only very small mechanical stresses in the measuring tube or a connected pipeline. Furthermore, the measuring tubes can be embodied to project quite far out from their axes and, thus, in spite of a relatively short installed length, also in the case of relatively low excitation power, be excited to oscillation amplitudes required for measuring flow and/or density.

The two mutually parallel, essentially identically formed measuring tubes of the measuring devices described in U.S. Pat. No. 5,796,001 and WO-A 01/33 174 are essentially steadily curved, i.e. they have essentially no straight sections. In contrast, the measuring tubes e.g. of the measuring devices shown in the U.S. Pat. No. 5,301,557, International Published Applications, WO-A 00/57 141, and WO-A 01/33 174 have, in each case, at least two straight tube segments, which are connected with one another via an arc shaped, especially circular arc shaped, tube segment. Such curved measuring tubes with straight tube segments are distinctive in comparison to steadily curved measuring tubes especially because they can be manufactured cost effectively by means of very simple bending tools.

Preferably, the measuring tubes are caused during operation to vibrate at a natural, instantaneous, resonant frequency. Since the natural resonant frequency depends on the instantaneous density of the fluid, besides the mass flow e.g. also the density of flowing fluids can be measured by means of conventional Coriolis mass flow measuring devices.

For registering oscillations of the measuring tubes, the measuring devices have a sensor arrangement composed of at least one inlet side and at least one outlet side, oscillation sensor, which especially can be electrodynamic sensors. Due to superpositioning of wanted- and Coriolis modes, the oscillations of the measuring tubes registered by means of the sensor arrangement on the inlet side and on the outlet side have a flow dependent, phase difference, which is ascertainable based on signals of the electrodynamic sensors.

Coriolis flow measuring devices and/or density measuring devices can have a cross-sensitivity to temperature influences and pressure of the media. For compensation of such temperature related disturbing influences, in the case of Coriolis mass flow measuring devices and/or density measuring devices, consequently, usually also at least one temperature sensor is provided e.g. for measuring the temperature of the measuring tube or a measuring tube environment.

Concerning the cross-sensitivity to the media pressure, among others, the following documents are noted: European Patent, EP 1 296 119 A1, U.S. Pat. No. 5,301,557, Published International Applications, WO-A 95/168 97, and WO-A 98/07 009. This cross-sensitivity of the measuring devices to pressure can be attributed, for instance, to the fact that measuring tubes have a stiffness dependent on the media pressure. In order to assure a measurement error of no more than 0.15% of the actual mass flow or the actual density, even in the case of fluctuating media pressure, consequently, measures for lessening the pressure dependence of the measurement signals are required.

For solution of the problem, it is provided, e.g. in U.S. Pat. No. 5,301,557, that comparatively thick-walled measuring tubes are used. This does lower the pressure dependence, however, simultaneously, the mass of the measuring tube increases, so that the relative contribution of the medium to the mass of the filled measuring tube decreases, whereby the sensitivity decreases in the case of density measurement. Additionally, the measuring tube becomes, as a whole, stiffer, so that a higher excitation power is required, in order still to achieve the same oscillation amplitudes.

Another opportunity for lessening the cross-sensitivity of the measuring device to pressure is described in Published International Applications, WO-A 98/07 009, and in WO-A 95/16 897. It is provided to ascertain the media pressure based on the resonance frequencies of two different oscillation modes and to take such into consideration in the ascertaining of the mass flow. This requires an additional exciter and increased computing power for measured value ascertainment.

The European publication EP 1 296 119 A1 discloses stabilizing the measuring tubes by means by a local stiffening, in order to lessen the influence of internal pressure on the bending oscillations. The relatively small supplemental masses of the stiffenings scarcely degrade the sensitivity to the primary measured variables, mass flow and density. This approach is basically interesting, leaves, however, still room for improvement.

SUMMARY OF THE INVENTION

Starting from the above described state of the art, consequently, an object of the invention is to provide an improved Coriolis mass flow measuring device and/or density measuring device, whose measuring tubes are simple to manufacture and whose cross-sensitivity to internal pressure or its changes can be kept small.

The object is achieved by the Coriolis mass flow measuring device and/or density measuring device.

The Coriolis mass flow measuring device and/or density measuring device of the invention includes at least two measuring tubes extending bent in the resting position, wherein the measuring tubes have measuring tube centerlines, which extend pairwise mirror symmetrically to a first mirror plane, which extends between the at least two measuring tubes, wherein the at least two measuring tube centerlines extend, in each case, mirror symmetrically to a second mirror plane, which extends perpendicularly to the first mirror plane; at least one exciter mechanism and at least one sensor arrangement; an inlet side collector and an outlet side collector, wherein the at least two measuring tubes are connected with the collectors for flow from the inlet side collector into the at least two measuring tubes and for flow from the at least two measuring tubes into the outlet side collector; a support body, which connects the inlet side collector and the outlet side collector rigidly with one another; and on the inlet side and on the outlet side, in each case, at least one, preferably two or more, plate-shaped couplers, wherein the at least two measuring tubes are connected pairwise with one another by means of the couplers, in order to form an oscillator, wherein the exciter mechanism is adapted to excite a bending oscillation, wanted mode between the at least two measuring tubes of the oscillator, wherein the sensor arrangement is adapted to register oscillations of the oscillator, wherein the at least two measuring tube centerlines of the at least two measuring tubes of at least one oscillator have between the second mirror plane and the collectors, in each case, a first bent section, a second bent section and a straight section, which is arranged between the bent sections and connects the two bent sections, wherein the first bent section and the second bent section are bent in opposite directions, wherein the second bent section is arranged, in each case, on the side of the straight section away from the second mirror plane, wherein the projection of the measuring tube centerline between the intersection with the second mirror plane and the transition between the straight section and the second bent section onto the second mirror plane defines an arc height (h), wherein the doubled separation between the second mirror plane and the measuring tube centerline at the transition between the straight section and the second bent section defines an arc width (w), wherein the quotient of the arc height (h) divided by the arc width (w) defines a relative arc height (hr), which amounts to not less than 0.5, especially not less than 0.65, wherein the first bent section has between the second mirror plane and the straight section a number of stiffening elements, which annularly grip around the at least two measuring tubes.

In a further development of the invention, in each case, a first coupler, which is nearest the second mirror plane, has a central plane, which is spaced no more than half, especially no more than a third, preferably no more than a fourth, of the outer diameter of the at least two measuring tubes connected with the coupler from the measuring tube centerline at the transition between the straight section and the second bent section.

In a further development of the invention, the first coupler is arranged in the second bent section.

In a further development of the invention, the measuring tube centerline in the second straight section forms with a normal vector to the second mirror plane an angle of not less than 60°, especially not less than 70°.

In a further development of the invention, the first bent section has between the second mirror plane and the straight section at least three, especially at least four, stiffening elements, which annularly grip around the at least two measuring tubes.

In a further development of the invention, the stiffening elements have in the direction of the measuring tube centerline a thickness, which amounts to no more than a fourth, especially no more than an eighth, of the outer diameter of the at least two measuring tubes.

In a further development of the invention, the stiffening elements have in the radial direction a thickness, which amounts to at least one, especially at least two, wall thicknesses of the measuring tube.

In a further development of the invention, the stiffening elements are arranged pairwise symmetrically to the first and/or second mirror plane.

In a further development of the invention, the relative arc height (hr) amounts to no more than 1.5, especially no more than 1.0.

In a further development of the invention, the Coriolis mass flow measuring device and/or density measuring device has a flow calibration factor (calf) for the mass flow as a function of an oscillatory behavior of the oscillator, wherein the flow calibration factor (calf) is a pressure dependence (d calf/d p), in the case of which |1/calf*d calf/dp|<70 ppm/bar.

In a further development of the invention, the Coriolis mass flow measuring device and/or density measuring device has a density calibration factor for the density (crho) as a function of at least one eigenfrequency (f1) of the oscillator, wherein the density calibration factor (crho) has a pressure dependence (d crho/d p), in the case of which |1/crho*d crho/dp|<60 ppm/bar, especially <40 ppm/bar.

In a further development of the invention, the inlet side and outlet side collectors are embodied stably in such a manner that they fulfill the functionality of a coupler.

In a further development of the invention, on the inlet side and on the outlet side, in each case, at least one coupler has, between the at least two measuring tubes connected by the coupler, a tuning opening, which is surrounded by a closed edge and which serves for influencing the oscillation characteristics of the oscillator.

In a further development of the invention, the tuning openings have in the first mirror plane an extent of at least 30%, for example, at least 50%, and especially at least 70%, of the diameter of the at least two measuring tubes.

In a further development of the invention, on the inlet side and on the outlet side, in each case, at least two couplers of a measuring tube pair connected by the couplers have such a tuning opening.

BRIEF DESCRIPTION OF THE DRAWINGS

The invention will now be explained in greater detail based on the examples of embodiments illustrated in the drawings. The figures of the drawing show as follows.

DETAILED DISCUSSION IN CONJUNCTION WITH THE DRAWINGS

Figure 1:
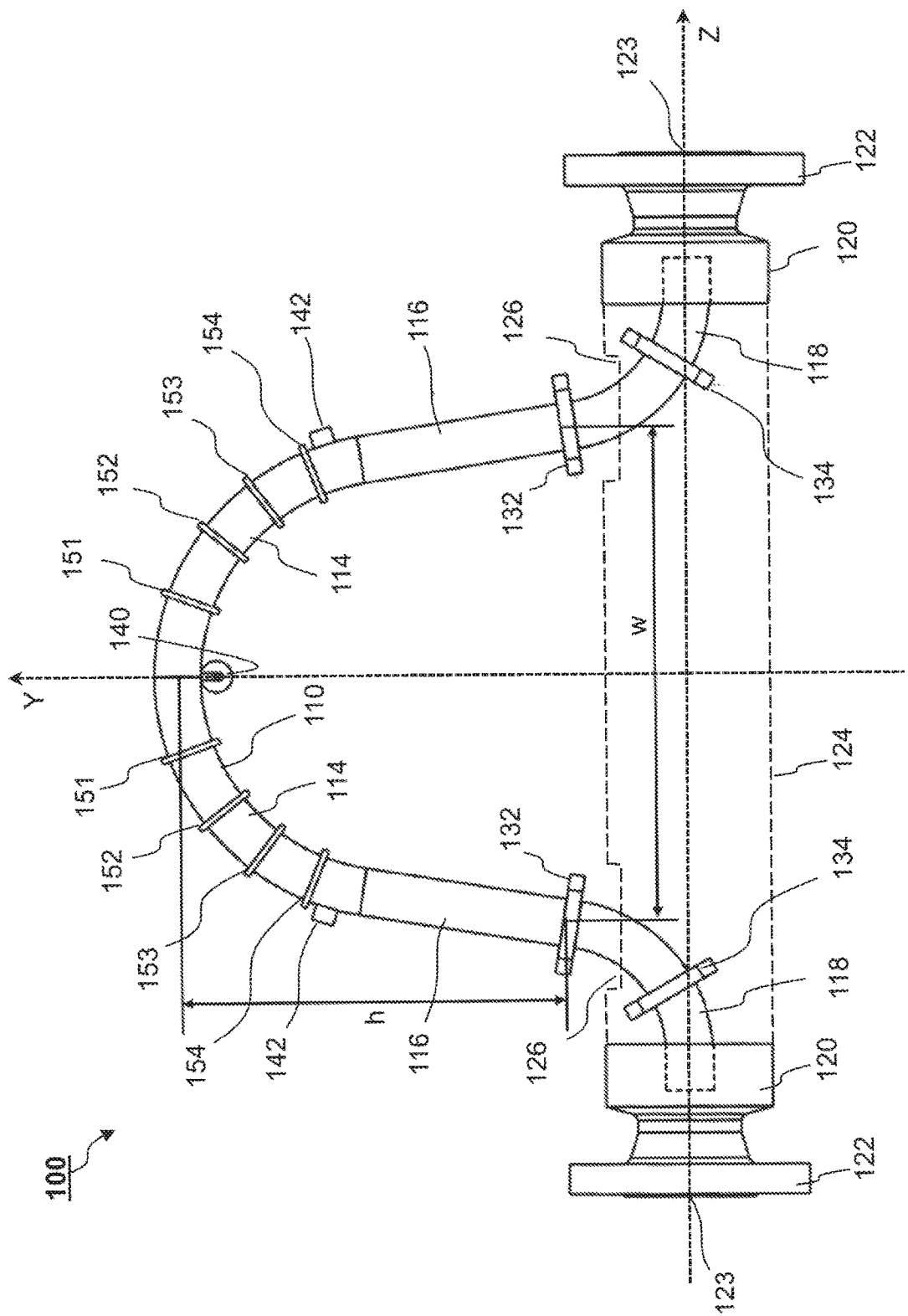
FIG. 1 is a schematic side view of a first example of an embodiment of a Coriolis mass flow measuring device and/or density measuring device of the invention.
Figure 2:
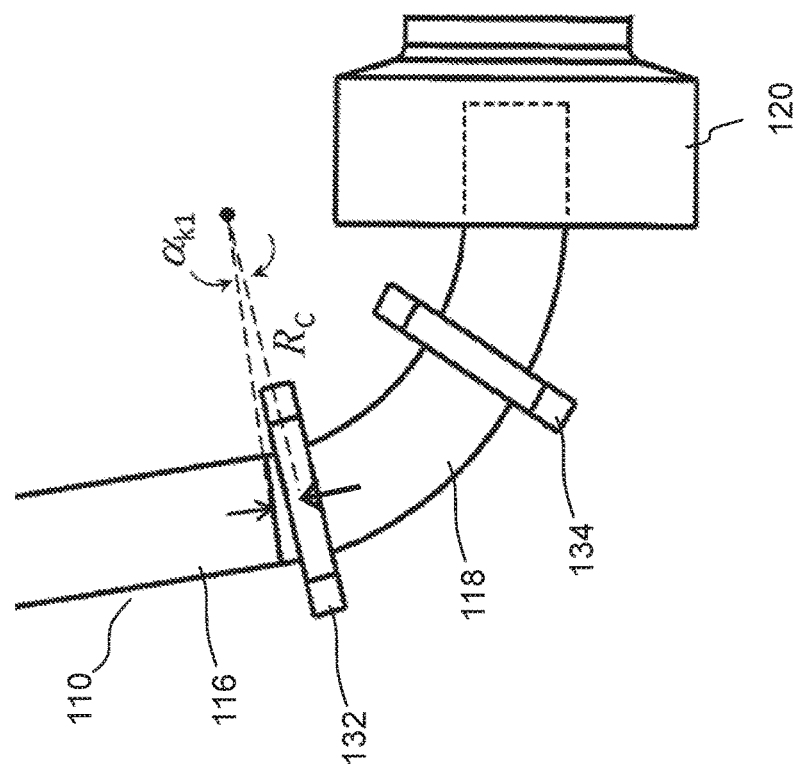
FIG. 2 is a side view of a detail of the example of an embodiment illustrated in FIG. 1.

The example of an embodiment of a Coriolis mass flow measuring device and/or density measuring device 100 of the invention shown in FIGS. 1 and 2 includes a pair of bent measuring tubes 110. Measuring tubes 110 extend between an inlet side collector 120 and an outlet side collector 120, and are connected fixedly with these, for example, by roll expansion, hard soldering, brazing or welding. Extending between the collectors 120 is a rigid support tube 124, which is connected fixedly with both collectors, whereby the collectors 120 are coupled rigidly with one another. Support tube 124 has, on its upper side, openings 126, through which the measuring tubes 110 are led from the collectors 120 out of the support tube 124 and back in again.

Collectors 120 have terminally, in each case, a flange 122, by means of which the Coriolis mass flow measuring device and/or density measuring device can be installed in a pipeline. A mass flow moves through the central openings 123 in the flanges 122 into and out of the measuring tubes 110, in order that the mass flow, and/or its density, can be measured.

Figure 3:
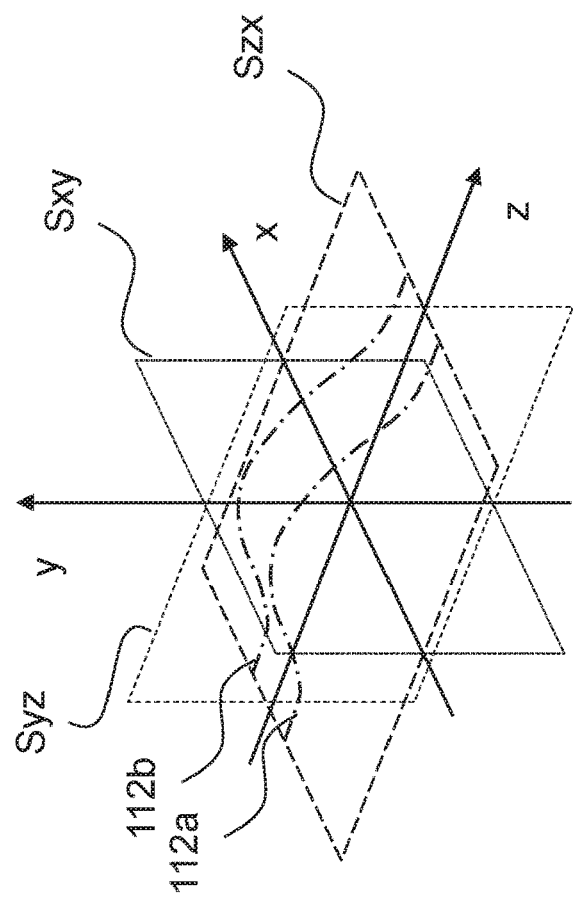
FIG. 3 is a coordinate system for the purpose of explaining the symmetries of the Coriolis mass flow measuring device and/or density measuring device of the invention.

Before explaining the detailed construction and operation of the Coriolis mass flow measuring device and/or density measuring device 100 of the invention further, some symmetry characteristics will be touched on briefly based on FIG. 3. FIG. 3 shows the measuring tube central axes 112a, 112b of the two measuring tubes 110, which form the oscillator: The measuring tube central axes 112a, 112b extend symmetrically to a first mirror plane Syz, which extends between the measuring tubes. The measuring tube central axes extend further symmetrically to a second mirror plane Sxy, which extends perpendicularly to the first mirror plane Syz. Lying in the second mirror plane are the peaks of the measuring tubes and the measuring tube central axes.

The measuring tube axes 112a, 112b extend preferably in planes, which extend parallel to the first mirror plane.

Regarding a third plane Szx, which extends perpendicularly to the first mirror plane and to the second mirror plane, and in which the measuring tube axes 112a, 112b extend in the collectors, there is no symmetry of the measuring tubes present.

The line of intersection between the first mirror plane Syz and the third plane defines a Z-axis of a coordinate system of the Coriolis mass flow measuring device and/or density measuring device. The line of intersection between the second mirror plane Sxy and the third plane Szx defines an X-axis of the coordinate system, and the line of intersection between the first mirror plane Syz and the second mirror plane defines the Y-axis of the coordinate system. With the coordinates defined in such a way, we return to FIGS. 1 and 2.

The pair of measuring tubes 110 form an oscillator, which is excited especially in a bending oscillation, wanted mode, in the case of which the measuring tubes oscillate in the X-direction with mutually opposite phases.

For influencing the oscillation characteristics, the measuring tubes 110 are connected on the inlet and outlet sides, in each case, with couplers 132, 134, wherein by the position of the two inner the couplers 132, thus those, which inlet side, and outlet side, in each case, are farthest removed from the corresponding collector 120, a free oscillatory length of an oscillator formed by the two measuring tubes 110 is established. This free oscillatory length influences greatly the bending oscillation, wanted mode of the oscillator, especially its eigenfrequency, with which the oscillator is preferably excited.

Outer couplers 134, which, in each case, are arranged between the inner node plates 132 and the collectors 120, serve especially to define other oscillation nodes, in order, on the one hand, to reduce the maximum mechanical stresses on the oscillating measuring tubes, and, on the other hand, to minimize the out-coupling of oscillatory energy into a pipeline, into which the Coriolis mass flow measuring device and/or density measuring device is mounted, and the in-coupling of disturbing oscillations from the pipeline. Preferably, the couplers have, in the first mirror plane, tuning openings surrounded by a peripheral edge. The tuning openings have the effect of further minimizing the out-coupling of oscillatory energy. The couplers are preferably arranged symmetrically to the first mirror plane and pairwise symmetrically to the second mirror plane.

For exciting bending oscillations of the measuring tubes in the X-direction, there is provided—with reference to the longitudinal direction, i.e. the Z-axis, in the middle of the Coriolis mass flow measuring device and/or density measuring device 100—between the two measuring tubes 110, an exciter mechanism 140, for example, an inductive exciter mechanism, which, is composed, for example, of a solenoidal coil on one measuring tube and an armature on the oppositely lying measuring tube. The oscillator formed by the two measuring tubes is preferably excited with its eigenfrequency of the moment. For registering the oscillations of the measuring tubes, sensor arrangements 142 are provided symmetrically in the longitudinal direction to the exciter mechanism 140. Each of the sensor arrangements is embodied as an inductive arrangement with a solenoidal coil on one tube and an armature on the other tube. Details concerning this are known to those skilled in the art and need not be explained here in further detail.

In the case of the example of an embodiment illustrated in FIG. 1, the sensor arrangements 142 are arranged outside a region surrounded by the measuring tubes 110 and the support tube 124 and on the inside of a measuring tube arc extending from the peaks of the measuring tubes. Of course, the sensor arrangements can also be located within the surrounded region, for example, in order to achieve a somewhat more compact form of construction.

Measuring tubes 110 have, in each case, two first bent sections 114, which are symmetric to one another relative to the second mirror plane and which connect with one another in the second mirror plane. Each of the first bent sections 114 has a bending angle of, for instance, 80°, wherein the radius of curvature of the tube central axis in the first bent sections amounts here to not less than eight, especially, for instance, nine tube radii. Adjoining the first bent section 114, in each case, is a straight section 116, which is followed, in turn, by, in each case, a second curved section 118, whose radius of curvature amounts here to, for instance, two thirds of the radius of curvature of the first bent section 114.

The second bent sections 118 extend, in each case, through one of the openings 126 in the support tube 124 and open into in one of the collectors 120.

The first bent sections 114 have, in each case, four annular stiffening elements 151, 152, 153, 154, which are distributed over the first bent sections 114. The distribution need not be the shown uniform distribution. The distribution can, in given cases, be varied for optimized reduction of the cross-sensitivity of the measured variables, mass flow and/or density, to pressure.

For positioning the inner coupler 132, the following considerations are to be taken into consideration. On the one hand, it is advantageous to provide the measuring tubes 110 with a large free oscillatory length. For this, the measuring tubes are led out from the support tube 124 in the second bent section 118, wherein the free oscillatory length rises with increasing arc height. To optimize the free oscillatory length, one would want to position the inner coupler, which limits the free oscillatory length, as low as possible. However, a part of the won arc height has to be given up—in the illustrated example of an embodiment, for instance, a fourth of the arc height, in order to assure, that, at most, only a short part of the second bent section 118 extends above the first coupler 132. Investigations in connection with the present invention have shown that the pressure dependence of the density measurement can be reduced, if the part of the second bent sections 118 above the first coupler 132 is not too large, as shown in FIG. 2. The coupler separation angle $\alpha_{k1}$, measured from the center of the radius of curvature of the measuring tube central axis, is a measure for the separation of the first coupler 132 from the transition between the straight section 116 and the second bent section 118. The coupler separation angle $\alpha_{k1}$ should be no more than 10° and has in the example of an embodiment a value of, for instance, 5° to 6°. In other words, the separation of the coupler central plane of the first coupler 132 from the transition between the straight section 116 and the second bent section 118 should be no more than half of an outer diameter of the measuring tube. In the illustrated example of an embodiment, this separation amounts to about a fourth of the outer diameter.

The Coriolis mass flow measuring device and/or density measuring device of the invention has, due to the measuring tube geometry of the invention, a high sensitivity for exact measuring of density and mass flow, wherein the cross sensitivities to the static pressure accompanying the measuring tube geometry are reduced by the described measures, such as the position of the first coupler 132 and the stiffening elements 151, 152, 153, 154 in the first bent section 114. In this way, the pressure dependence of the density measurement is significantly reduced. Results for this are given in Table 1. The term "Calf" referred to therein is a calibration factor, or proportionality factor, for ascertaining the mass flow from the phase difference between the sensors 142 of the sensor arrangement.

TABLE 1

| Inner tube diameter [mm] | 15.2 | 28.0 | 43.1 | 68.9 |
|---|---|---|---|---|
| Flow Calibration Factor (Calf) | 0.90 | 0.50 | 0.50 | 0.75 |
| Relative pressure dependence of density calibration [ppm/bar] | −34 | −27.8 | −27 | −20 |
| Relative pressure dependence of calf [ppm/bar] | −38.3 | −31.2 | −51.7 | −43.5 |
| Relative pressure dependence of the density calibration without stiffening elements [ppm/bar] | −123.5 | −50.4 | −50.7 | −53 |
| Relative pressure dependence of the calf without stiffening elements [ppm/bar] | −161.4 | −87.6 | −190.3 | −80.9 |

The invention claimed is:

1. A coriolis mass flow measuring device and/or density measuring device, comprising:

at least two measuring tubes extending bent in the resting position, said at least two measuring tubes have measuring tube centerlines, which extend pairwise mirror symmetrically to a first mirror plane, which extends between said at least two measuring tubes; said measuring tube centerlines extend, in each case, mirror symmetrically to a second mirror plane, which extends perpendicularly to the first mirror plane;

at least one exciter mechanism, said exciter mechanism being adapted to excite a bending oscillation, wanted mode between the two measuring tubes of the oscillator; and at least one sensor arrangement, said sensor arrangement being adapted to register oscillations of the oscillator;

inlet side and outlet side collectors said at least two measuring tubes are connected with the collectors for flow from said inlet side collector into the measuring tubes and for flow from the measuring tubes into said outlet side collector;

a support body, which connects said inlet side collector and said outlet side collector rigidly with one another; and on the inlet side and on the outlet side, in each case, two or more coupling plates, said at least two measuring tubes are connected pairwise with one another by means of the coupling plates, in order to form an oscillator, wherein:

the measuring tube centerlines of said at least two measuring tubes of at least one oscillator have between said second mirror plane and the collectors, in each case, a first bent section, a second bent section and a straight section arranged between said bent sections and connecting said two bent sections;

said first bent section and said second bent section are bent in opposite directions, wherein said second bent section is arranged, in each case, on the side of said straight section away from said second mirror plane;

the projection of the measuring tube centerlines between the intersection with said second mirror plane and the transition between said straight section and said second bent section onto said second mirror plane defines an arc height;

the doubled separation between said second mirror plane and the measuring tube centerlines at the transition between said straight section and said second bent section defines an arc width;

the quotient of the arc height divided by the arc width defines a relative arc height, which amounts to not less than 0.65;

said first bent section has between said second mirror plane and said straight section at least three stiffening elements, which in each case annularly grip around one of said at least two measuring tubes;

on said inlet side and on said outlet side, in each case, at least one of said coupling plates, between the measuring tubes connected by the coupling plates, comprises a tuning opening, which is surrounded by a closed edge and which serves for influencing oscillation characteristics of the oscillator; and said tuning openings have in said first mirror plane an extent of at least 30% of the diameter of the at least two measuring tubes.

2. The coriolis mass flow measuring device and/or density measuring device as claimed in claim 1, wherein:

said stiffening elements have in the direction of the measuring tube centerlines a thickness, which amounts to no more than a fourth of the outer diameter of the measuring tube.

3. The coriolis mass flow measuring device and/or density measuring device as claimed in claim 1, wherein:

said stiffening elements have in the radial direction a thickness, which amounts to at least one wall thickness of the at least two measuring tubes.

4. The coriolis mass flow measuring device and/or density measuring device as claimed in claim 1, wherein:

said stiffening elements are arranged pairwise symmetrically to said first and/or second mirror plane.

5. The coriolis mass flow measuring device and/or density measuring device as claimed in claim 1, wherein:

the relative arc height (hr) amounts to no more than 1.5.

6. The coriolis mass flow measuring device and/or density measuring device as claimed in claim 1, which has a flow calibration factor (calf) for the mass flow as a function of an oscillatory behavior of the oscillator, wherein:

said flow calibration factor (calf) has a pressure dependence (d calf/d p), in the case of which |1/calf*d calf/dp|<70 ppm/bar.

7. The coriolis mass flow measuring device and/or density measuring device as claimed in claim 1, which has a density calibration factor for the density (crho) as a function of at least one eigenfrequency of said oscillator; wherein:

said density calibration factor (crho) has a pressure dependence (d crho/d p), in the case of which |1 /crho*d crho/dp|<60 ppm/bar.

8. The coriolis mass flow measuring device and/or density measuring device as claimed in claim 1, wherein:

said inlet side and outlet side collectors are embodied stably in such a manner that they fulfill the functionality of a coupler.

9. The coriolis mass flow measuring device and/or density measuring device as claimed in claim 1, wherein:

on said inlet side and on said outlet side, in each case, at least two coupling plates of a measuring tube pair connected by said coupling plates have such a tuning opening.

10. The coriolis mass flow measuring device and/or density measuring device as claimed in claim 1, wherein:

said tuning openings have in said first mirror plane an extent of at least 50% of the diameter of the measuring tubes.

11. The coriolis mass flow measuring device and/or density measuring device as claim in claim 1, wherein:

on said inlet side and on said outlet side, in each case, at least two coupling plates of a measuring tube pair connected by said coupling plates have such a tuning opening.

12. The coriolis mass flow measuring device and/or density measuring device as claimed in claim 1, wherein:

in each case, a first coupler, which is nearest said second mirror plane, has a central plane, which is spaced no more than half of the outer diameter of the at least two measuring tubes connected with said coupler from the transition between said straight section and said second bent section at the measuring tube centerlines.

13. The coriolis mass flow measuring device and/or density measuring device as claimed in claim 12, wherein;

said first coupler is arranged in said second bent section.

14. The coriolis mass flow measuring device and/or density measuring device as claimed in claim 1, wherein:

the measuring tube centerlines in said second straight section forms with a normal vector to said second mirror plane an angle of not less than 70°.

15. The coriolis mass flow measuring device and/or density measuring device as claimed in claim 1, wherein:

said stiffening elements have in the direction of the measuring tube centerlines a thickness, which amounts to no more than an eighth of the outer diameter of the measuring tube.

16. The coriolis mass flow measuring device and/or density measuring device as claimed in claim 1, wherein:

said stiffening elements have in the radial direction a thickness, which amounts to at least two wall thicknesses of the at least two measuring tubes.

17. The coriolis mass flow measuring device and/or density measuring device as claimed in claim 1, wherein:

the relative arc height (hr) amounts to no more than 1.0.

18. The coriolis mass flow measuring device and/or density measuring device as claimed in claim 1, which has a density calibration factor for the density (crho) as a function of at least one eigenfrequency of said oscillator; wherein:

said density calibration factor (crho) has a pressure dependence (d crho/d p), in the case of which |1/crho*d crho/dp|<40 ppm/bar.

19. The coriolis mass flow measuring device and/or density measuring device as claimed in claim 1, wherein:

said tuning openings have in said first mirror plane an extent of at least 70% of the diameter of the at least two measuring tubes.

* * * * *